United States Patent
Uchida et al.

(10) Patent No.: US 8,293,397 B2
(45) Date of Patent: Oct. 23, 2012

(54) BATTERY ASSEMBLY

(75) Inventors: Yasunori Uchida, Aichi-ken (JP); Kimio Tsubaki, Aichi-ken (JP); Shigeki Takeo, Aichi-ken (JP); Hiroshi Onaka, Aichi-ken (JP); Tatsuo Suzuki, Aichi-ken (JP); Kenichi Mitsui, Aichi-ken (JP)

(73) Assignee: Toyoda Gosei Co., Ltd., Aichi-pref (JP)

( * ) Notice: Subject to any disclaimer, the term of this patent is extended or adjusted under 35 U.S.C. 154(b) by 649 days.

(21) Appl. No.: 12/219,958

(22) Filed: Jul. 31, 2008

(65) Prior Publication Data

US 2009/0061299 A1 Mar. 5, 2009

(30) Foreign Application Priority Data

Aug. 27, 2007 (JP) .................................. 2007-219812

(51) Int. Cl.
*H01M 10/50* (2006.01)
*H01M 2/00* (2006.01)
*H01M 2/04* (2006.01)
*H01M 4/00* (2006.01)
*H01M 4/13* (2010.01)
*H01M 4/58* (2010.01)

(52) U.S. Cl. ........ 429/120; 429/163; 429/176; 429/223; 429/231.95

(58) Field of Classification Search .................. 429/151, 429/152, 159, 160, 163, 172, 120, 176, 223, 429/231.95
See application file for complete search history.

(56) References Cited

U.S. PATENT DOCUMENTS

| | | | |
|---|---|---|---|
| 6,555,264 B1* | 4/2003 | Hamada et al. ............... | 429/156 |
| 6,821,671 B2* | 11/2004 | Hinton et al. ................. | 429/120 |
| 2003/0017383 A1 | 1/2003 | Ura et al. | |
| 2003/0165734 A1 | 9/2003 | Hinton et al. | |
| 2004/0174138 A1 | 9/2004 | Moores, Jr. et al. | |
| 2004/0180257 A1 | 9/2004 | Kimoto | |
| 2007/0133151 A1 | 6/2007 | Jeon et al. | |
| 2007/0259261 A1* | 11/2007 | Rejman et al. ................ | 429/158 |

FOREIGN PATENT DOCUMENTS

| | | |
|---|---|---|
| EP | 1 278 263 | 1/2003 |
| EP | 1 818 998 | 8/2007 |
| JP | A-07-045310 | 2/1995 |
| JP | A-08-148187 | 6/1996 |
| JP | A-08-321329 | 12/1996 |
| JP | A-10-189062 | 7/1998 |
| JP | A-2001-313018 | 11/2001 |
| JP | A-2003-297303 | 10/2003 |
| JP | A-2005-317455 | 11/2005 |
| JP | A-2006-048996 | 2/2006 |
| JP | A-2007-012486 | 1/2007 |
| WO | WO 03/071616 | 8/2003 |

OTHER PUBLICATIONS

Extended European Search Report dated Dec. 15, 2008 in corresponding European patent application No. 08013699.7-1227 (and English translation). Notification of Reasons for Refusal dated Feb. 9, 2010 issued from the Japan Patent Office for corresponding patent application No. 2007-219812.

* cited by examiner

*Primary Examiner* — Patrick Ryan
*Assistant Examiner* — Julian Anthony
(74) *Attorney, Agent, or Firm* — Posz Law Group, PLC (57) ABSTRACT

A battery assembly includes single-battery cells, and thermally-conductive members. The thermally-conductive members are formed of a soft material as a plated configuration. The soft material exhibits thermal conductivity and electric insulatability. The single-battery cells, and the thermally-conductive members are adhered to each other, and are disposed one after another alternately in a row, thereby interposing the thermally-conducive members between the single-cell batteries. The thermally-conductive members include a radiation surface respectively from which heat that the single-battery cells produce radiates. The single-battery cells are cooled indirectly by cooling the radiation surfaces of the thermally-conductive members.

11 Claims, 9 Drawing Sheets

BATTERY ASSEMBLY

INCORPORATION BY REFERENCE

The present invention is based on Japanese Patent Application No. 2007-219,812, filed on Aug. 27, 2007, the entire contents of which are incorporated herein by reference.

BACKGROUND OF THE INVENTION

1. Field of the Invention

The present invention relates to a battery assembly, which can be used suitably as an electric power source for electric vehicles and hybrid vehicles.

2. Description of the Related Art

Nickel-hydrogen secondary battery and lithium ion battery, which are used as an electric power source for driving electric automobile, have been required to exhibit a high energy density, and have been demanded to occupy least on-board space as much as possible. Accordingly, it has been a general practice to make a battery assembly by assembling a plurality of single-battery cells. For example, a few dozens of single-battery cells, which are formed as a rectangular parallelepiped configuration and whose battery capacity is from a few volts to a few dozens of volts, are connected in series, and then the resulting battery subassembly is stored in a package to make a battery assembly. The resultant battery assembly has been installed under the rear passenger seat of vehicle or in the trunk room thereof, for instance.

However, the performance and longevity of battery assembly depend greatly on temperature conditions, that is, the higher the ambient temperature is the more likely it is that the performance and longevity have degraded remarkably. In view of this, it has been carried out to form a cooling passage, which communicates with the atmosphere, on the surface of single-cell battery; and then to introduce the passenger-room indoor air into the resultant cooling passage, or to forcibly introduce the air-conditioning air into it.

Meanwhile, in nickel-hydrogen secondary battery, for instance, it is impossible to avoid such a phenomenon that the single-battery cells, which are formed as a rectangular parallelepiped configuration, expand upon charging the nickel-hydrogen secondary battery so that the single-battery cells' largest-area side surfaces bulge outward like an arc shape. If such is the case, in a battery assembly which is made up of a plurality of assembled single-battery cells that are formed as a rectangular parallelepiped configuration, it is probable that a large stress might concentrate on the contacted site because the single-battery cells' opposite wall surfaces, their opposite largest-area side surfaces, contact with each other in a small contact area.

Accordingly, for the purpose of making the charging/discharging characteristics of respective single-battery cells uniform by means of equalizing the inner pressures of respective single-battery cells, it has been carried out to apply a predetermined load to a plurality of single-battery cells, thereby arranging the single-battery cells in such a manner that they are pressurized to be bound to each other. For example, Japanese Unexamined Patent Publication (KOKAI) Gazette No. 2001-313,018 discloses such a battery assembly. In this conventional battery assembly, a plurality of single-battery cells are arranged in the thickness direction, a binder plate is superimposed on the thickness-wise opposite ends, respectively; and then the two binder plates are tightened up with a clamping rod in such a direction that they approach to each other. Consequently, it is possible to adhere the single-battery cells to each other, because the two binder plates are tightened up in such a direction that they approach to each other. Thus, loading a predetermined load to the respective single-battery cells makes it possible to inhibit them from expanding as described above.

However, the conventional battery assembly set forth in Japanese Unexamined Patent Publication (KOKAI) Gazette No. 2001-313,018 is associated with such a problem the single-battery cells, which are disposed at around the central portion, are less likely to radiate heat than the single-battery cells, which are disposed at around the opposite ends, do. When the respective single-battery cells thus exhibit differing cooling characteristics to each other, fluctuations, such as fluctuating outputs and fluctuating longevities, have occurred between the respective single-battery cells. As a result, the conventional battery assembly has come to output electricity unstably, and has eventually come to show a shortened longevity.

In view of above, Japanese Unexamined Patent Publication (KOKAI) Gazette No. 2007-12,486 proposes a battery assembly in which the tops of a plurality of single-battery cells are accommodated in a battery chamber with a sealed construction; and in which the bottoms of the respective single-battery cells are exposed out into a cooling chamber. The conventional battery assembly makes it possible to cool the respective single-battery cells uniformly by distributing a cooling medium, such as cooling air, through the cooling chamber.

Moreover, Japanese Unexamined Patent Publication (KOKAI) Gazette No. 7-45,310 proposes a battery assembly, which comprises a plurality of heat pipes, a plurality of single-battery cells, and a plurality of radiator plates. The heat pipes are disposed near the single-battery cells, respectively, and the ends of the heat pipes are engaged with the radiator plates. Thus, the heat, which is produced in the single-battery cells, is radiated to the outside.

However, the above-described conventional battery assemblies have been jumboized or grown in size because they have complicated structures. Therefore, they suffer from a drawback in view of on-board space, or in view of cost.

Figure 12:
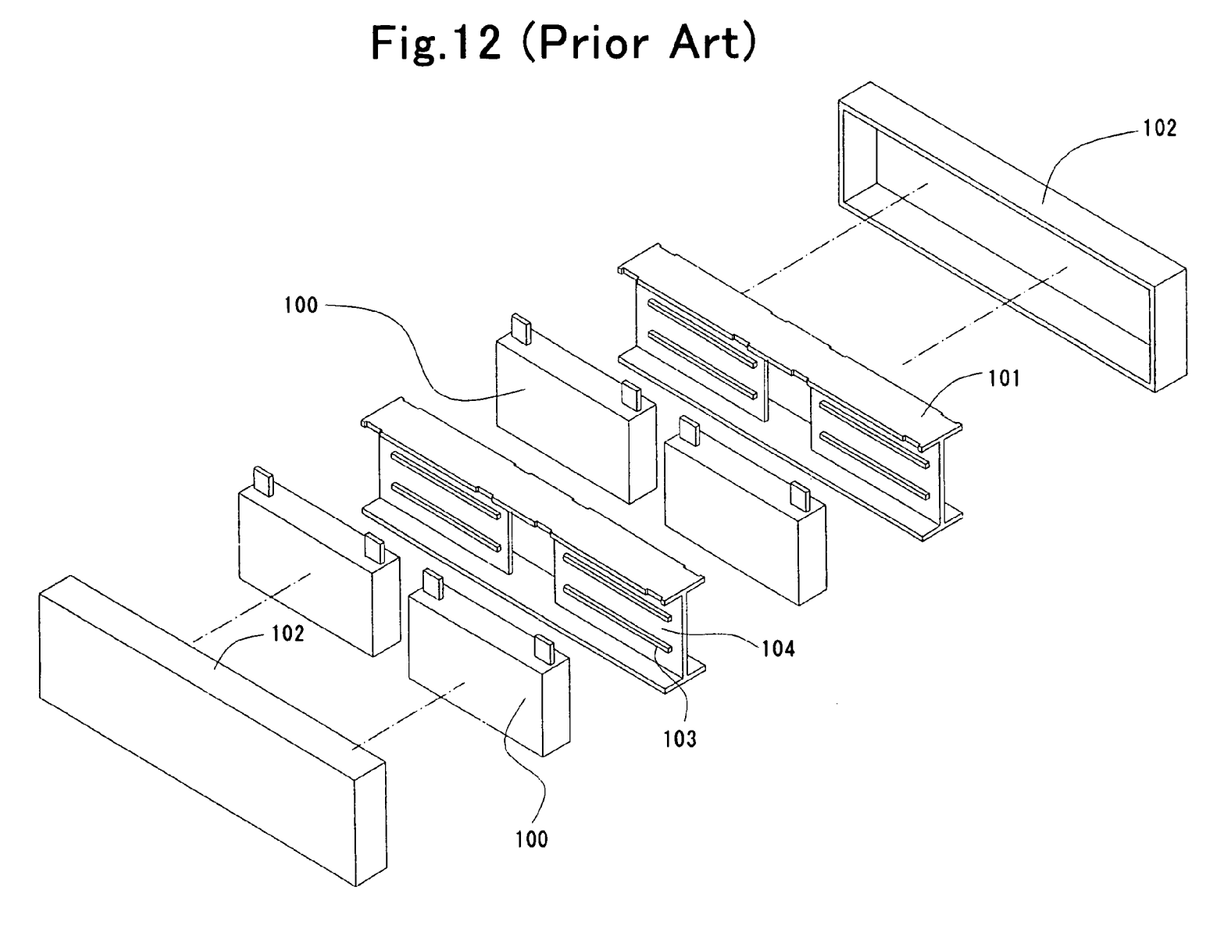
FIG. 12 is an exploded perspective diagram for illustrating a conventional battery assembly.

Taking the aforementioned problems into account, the following practice has been carried out, for example, as set forth in Japanese Unexamined Patent Publication (KOKAI) Gazette No. 2006-48,996. Specifically, as illustrated in FIG. 12, a spacer 101 is interposed between two paired single-battery cells 100, 100; a plurality of the resulting battery subassemblies are disposed one after another in a row so that the paired single-battery cells 100, 100 and the spacers 101 are disposed alternately so as to face the largest-area side surfaces of the paired single-cell battery cells 100, 100 to each other by way of the spacer 101 intervening therebetween; a binder plate 102 is disposed at the opposite ends of the resultant battery subassembly, respectively; and the binder plates 102, 102 are bound with a clamping rod in the direction of disposing the battery subassemblies one after another, thereby completing a battery assembly. In the conventional battery assembly, the spacers 101 are provided with ribs 103, thereby forming a space 104, which exhibits a height of from 1 to 2 mm, between each of the single-battery cells 100 and spacers 101, respectively. Therefore, even when the single-battery cells 100 expand, it is possible to prevent the facing wall surfaces of the single-battery cells 100, the facing largest-area side surfaces thereof, from interfering with each other. Moreover, it is possible to cool the single-battery cells 100 by flowing a cooling medium, such as air, through the spaces 104. Thus, it is possible to make the cooling characteristic, which is likely to fluctuate between the singe-battery cells 100, uniform, and thereby it is possible to extend the longevity of the respective single-battery cells 100.

However, in the conventional battery assembly that is set forth in Japanese Unexamined Patent Publication (KOKAI) Gazette No. 2006-48,996, there might occur such an instance that foreign materials, such as dust, deposit in the spaces 104 of the battery subassemblies. If such is the case, it becomes difficult to cool the respective single-battery cells 100 uniformly so that differences have arisen between the cooling characteristics that the single-battery cells 100 exhibit. Moreover, although air from air conditioner has been used in general as cooling medium, the air might result in dew condensation in the spaces 100 depending on the temperature difference between the air and the outside air. If the resulting dew drops should have moved to the electrodes of the single-battery cells 100, it is not necessarily possible to say that the conventional battery assembly could have hardly been short-circuited.

SUMMARY OF THE INVENTION

The present invention has been developed in view of the aforementioned circumstances. It is therefore an object of the present invention to provide a battery assembly comprising a plurality of single-battery cells being disposed one after another in a row, battery assembly which can make the respective single-battery cells exhibit a cooling characteristic uniformly and which can prevent drawbacks resulting from dust deposition and dew condensation from occurring.

A battery assembly according to the present invention can solve the aforementioned problems, and comprises:

a plurality of single-battery cells being formed as a rectangular parallelepiped configuration;

a plurality of thermally-conductive members being formed of a soft material as a plated configuration, the soft material exhibiting thermal conductivity and electric insulatability;

the battery assembly being made by contacting the single-battery cells and the thermally-conductive members to each other, disposing them one after another alternately in a row, and binding them by means of pressurizing them on both ends thereof in opposite directions to a direction of disposing them one after another alternately in a row;

the thermally-conductive members comprising a contact surface, to which a largest-area side surface of the single-battery cells contacts, and a radiation surface, which is exposed to a radiation space; and the single-battery cells being cooled indirectly by cooling the radiation surfaces of the thermally-conductive members.

When making the present battery assembly, the single-battery cells are bound by means of pressurizing them on the both ends of a battery subassembly, which turns into the present battery assembly, in opposite directions to a direction of disposing them one after another in a row, and thereby the single-battery cells, which are disposed on the opposite sides of the respective soft thermally-conductive members, compress the soft thermally-conductive members, respectively. Accordingly, the contact surfaces of the soft thermally-conductive members contact onto the larges-area side surfaces of the single-battery cells, respectively. Consequently, the heat, which generates in the single-battery cells, is conducted from the contact surfaces of the soft thermally-conductive members to the radiation surfaces thereof, and is then radiated from the radiation surfaces of the soft thermally-conductive members to the radiation space eventually.

Specifically, the present battery assembly is free of any clearance or gap between the respective single-battery cells and the soft thermally-conductive members. Accordingly, no such problem arises at all as the dust deposition that might occur in the spaces 104 of the conventional battery assembly being disclosed in Japanese Unexamined Patent Publication (KOKAI) Gazette No. 2006-48,996. Consequently, even when the present battery assembly is put in service for a long period of time, the present battery assembly can make the differences between the cooling characteristics, which the respective single-battery cells exhibit, uniform, because the single-battery cells are cooled under substantially the same cooling condition to each other. As a result, the present battery assembly can demonstrate a long-lasting longevity.

Moreover, between the respective single-battery cells, it is not needed at all to provide the present battery assembly with such spaces as the spaces 104 in the conventional battery assembly that is set forth in Japanese Unexamined Patent Publication (KOKAI) Gazette No. 2006-48,996. Therefore, the present battery assembly has such a compact overall configuration that makes it possible to contract its own on-board space, because the distance between the respective single-battery cells can be reduced. In addition, when disposing the radiation surfaces of the soft thermally-conductive members at locations, which are remote from the electrodes of the single-battery cells, respectively, the present battery assembly can prevent the short circuit as well that results from the dew condensation.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS.

Having generally described the present invention, a further understanding can be obtained by reference to the specific preferred embodiments which are provided herein for the purpose of illustration only and not intended to limit the scope of the appended claims.

A battery assembly according to the present invention can be used suitably as an electric power source for electric vehicles and hybrid vehicles.

In the present battery assembly, it is possible to employ ordinary so-called square-shaped battery cells as a plurality of single-battery cells. As the single-battery cells, although it is allowable to employ such a square-shaped battery as those having a housing made from resin, or those having an insulation coating being coated on their surfaces, it is preferable to employ single-battery cells that have a housing, which is made from metal exhibiting high thermal conductivity, such as iron or aluminum; and which is exposed to the outside. The single-battery cells are provided with a pair of protruding electrodes on the top in general. A plurality of the single-battery cells are usually disposed one after another in a row so as to make all of their parts, which are provided with the paired electrodes, face the same side.

Moreover, in the present battery assembly, a plurality of thermally-conductive members are formed of a soft material, which exhibits thermal conductivity and electric insulatability, as a plated configuration. Here, the thermally-conductive members can desirably exhibit such a degree of softness as an Askar C hardness of 50 or less. When the thermally-conductive members show such a softness degree as 50 or less on the Askar C hardness scale, the thermally-conductive members can produce adhesiveness to the single-battery cells' largest-area side surfaces securely, and can thereby radiate the heat, which generates in the single-battery cells, efficiently. Note that the Askar C hardness is a rubber hardness scale that is defined in "SRIS0101," a standard specification being determined by the Society of Rubber Industry, Japan, and is equivalent to the Shore hardness E that is defined in JIS (Japanese Industrial Standards) "K 6253." In addition, the thermally-conductive members can desirably exhibit such a thermal conductive property that the thermal conductivity is of 5 W/m·K or more. The thermally-conductive members that show a lower thermal conductivity than 5 W/m·K are not preferable, because such thermally-conductive members make the single-battery cells less likely to radiate heat.

As for a soft material having the above-described characteristics, it is possible to employ silicone rubber, for instance. Not only silicone rubber has both thermal conductivity and high electric insulatability, but also it is such a soft material that exhibits an Askar C of from 2 to 45 approximately. Moreover, general rubber or thermoplastic elastomer cannot be employed as it is because the thermal conductivity is too low. However, it is probable to use general rubber or thermoplastic when it is mixed with a highly thermally-conductive material, such as diamond powder, for instance.

The thermally-conductive members can be formed as a sheet shape to interpose them between the neighboring single-battery cells, respectively. If such is the case, however, it is difficult to control the compression magnitudes of the respective thermally-conductive members. Accordingly it is probable that the single-battery cells, which are disposed on the opposite sides of the respective thermally-conductive members, might expand differently to exhibit different expansion magnitudes to each other. Consequently, the present battery assembly can desirably further comprise an electrically-insulatable hard spacer, which retains a part of the thermally-conductive members' periphery respectively. The hard spacers, which thus intervene between the respective thermally-conductive members and single-battery cells, can control the expansion magnitudes of the thermally-conductive members.

The hard spacers, for instance, can be formed of electrically-insulatable resin, such as polypropylene (PP) resin. For example, the hard spacers can be provided with a window, respectively, which penetrates the hard spacers in the thickness-wise direction, thereby retaining the thermally-conductive members respectively in the resulting windows. As for such a retaining method, the following are available: it is allowable to retain the thermally-conductive members in the hard spacer's windows by means of depression-and-protrusion or irregularity engagement; or it is possible to retain the thermally-conductive members in the hard spacer's windows by means of carrying out insert molding in which the thermally-conductive members are disposed in a mold and then molding the hard spacers around the thermally-conductive members to retain them therein respectively. Note that the thermally-conductive members can desirably have a thickness, which is thicker by about from 0.2 mm to 2 mm approximately than a thickness that each of the hard spacers has around the window. If such is the case, the single-battery cells compress the thermally-conductive members upon being bound by means of pressurizing them, and thereby the thermally-conductive members come to have a thickness, which is equivalent to that of the hard spacers.

Moreover, the thermally-conductive members can preferably comprises a contact surface, which faces the single-battery cells and bulges as a convexed spherical surface protruding toward the single-battery cells, respectively. When binding the thus made thermally-conductive members with the single-battery cells by means of pressurizing them, the central part of the thermally-conductive members' convexed spherical surface first comes in contact with the single-battery cells, respectively, and then produces an increasing contact area, which enlarges from the center to the outside, as the thermally-conductive members are compressed by the single-battery cells, respectively. Accordingly, the thermally-conductive members' convexed spherical contact surfaces prevent air from remaining between the single-battery cells and the thermally-conductive members. Consequently, the preferable thermally-conductive members enable the single-battery cells to exhibit improved heat radiatability.

In addition, at least one of the thermally-conducive members can preferably be provided with an electrically-insulatable inhibitor. The electrically-insulatable inhibitor inhibits the largest-area side surfaces of the single-battery cells from approaching to each other. The thermally-conductive member that has the inhibitor can inhibit the single-battery cells from expanding more securely, that is, the thermally-conductive member can equalize the pressures inside the single-battery cells and can thereby make the charging/discharging characteristics of the single-battery cells uniform. It is allowable to form the inhibitor integrally with one of the hard spacers, or to form it by burying hard resin in one of the thermally-conductive members.

The present battery assembly comprises a radiation space to which a plurality of the thermally-conductive members' radiation surfaces are exposed. For example, it is possible to contact the respective thermally-conductive members' radiation surfaces with air. Alternatively, it is allowable to provide the thermally-conductive members with a tab which extends from the thermally-conductive members, respectively, and then to dispose the resulting tabs in an identical direction so that they protruded into air.

In the above-described alternative preferable construction, that is, in the case of providing the thermally-conductive members with the tabs, it is possible to make the radiation space in the following manner. A battery subassembly, which is made by disposing the single-battery cells and the thermally-conductive members one after another alternately in a row and then binding them by means of pressurizing them, is accommodated in a casing; and then a tunnel-shaped air-flow passage is formed between the thermally-conductive members' radiation surfaces, or their surfaces from which the tabs protrude, and the casing's inner surface. The resulting tunnel-shaped air-flow passage can be adapted into the radiation space. If such is the case, it is possible to radiate the heat, which generates in the respective single-battery cells, uniformly by way of the thermally-conductive members' radiation surfaces or tabs by distributing air-conditioning air, for instance, through the tunnel-shaped air-flow passage.

Moreover, as described in the following examples, it is allowable to dispose a heat sink, which comprises a plurality of radiator plates being disposed one after another in a row, in the radiation space, and then to make the radiation surface of at least one of the thermally-conductive members contact with the heat sink. Thus, when contacting air-conditioning air with the heat sink, the present battery assembly can radiate the heat, which generates in the respective single-battery cells, uniformly by way of the heat sink via one of the thermally-conductive member.

Note that, when using a heat sink, it is desirable to dispose the heat sink under a battery subassembly that is made by disposing the single-battery cells and thermally-conductive members one after another alternately in a row and then binding them by means of pressurizing them. When the heat sink is thus disposed under the battery subassembly, even if dew condensation should have occurred on the heat sink, it is possible to prevent the resulting dewdrops from contacting with the single-cell batteries. Therefore, the present battery assembly can prevent the occurrence of short circuit securely.

EXAMPLES

Hereinafter, the present battery assembly will be described in detail with reference to specific examples and experimental examples.

Example No. 1

Figure 1:
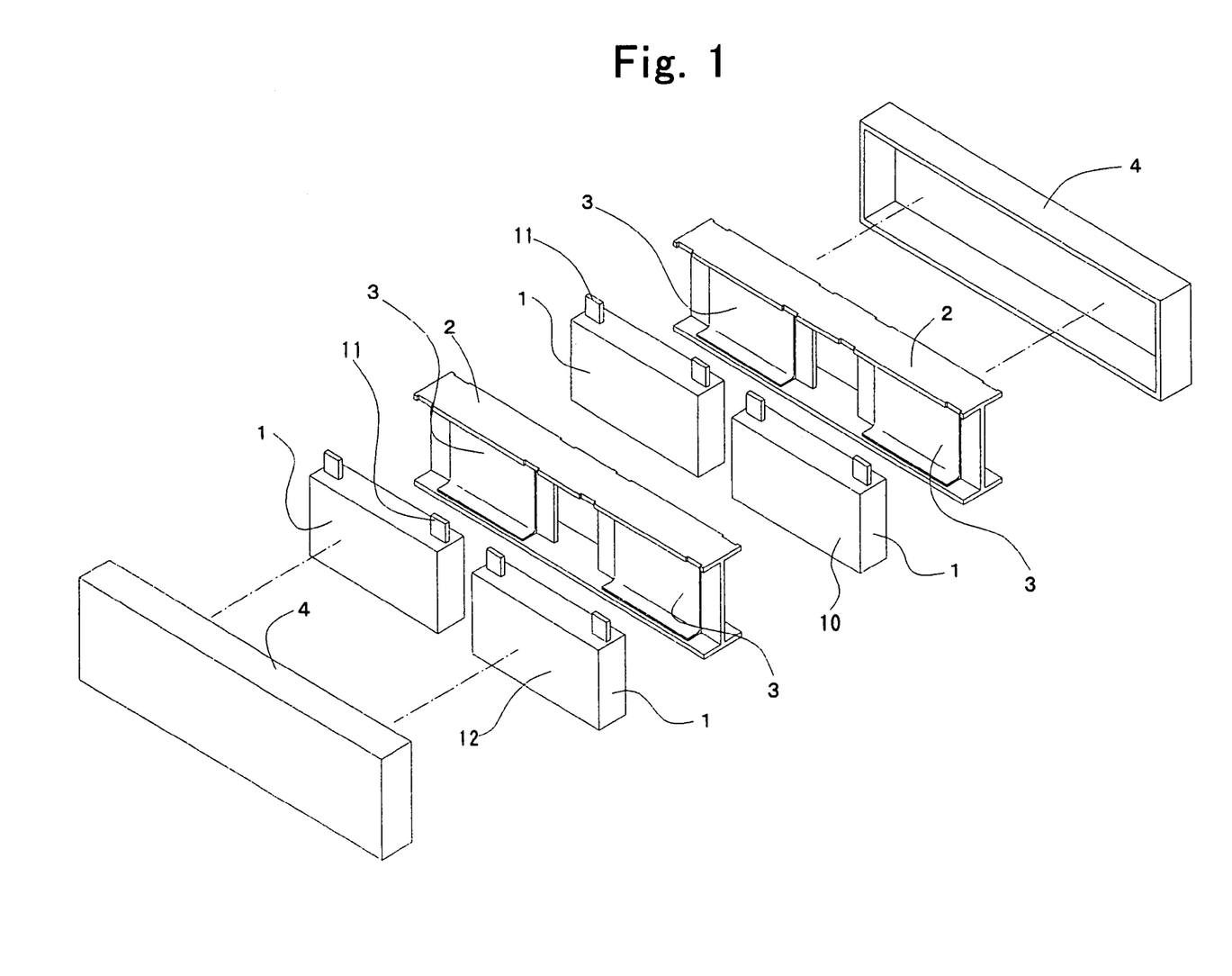
FIG. 1 is an exploded perspective diagram for illustrating a battery assembly according to Example No. 1 of the present invention.
Figure 3:
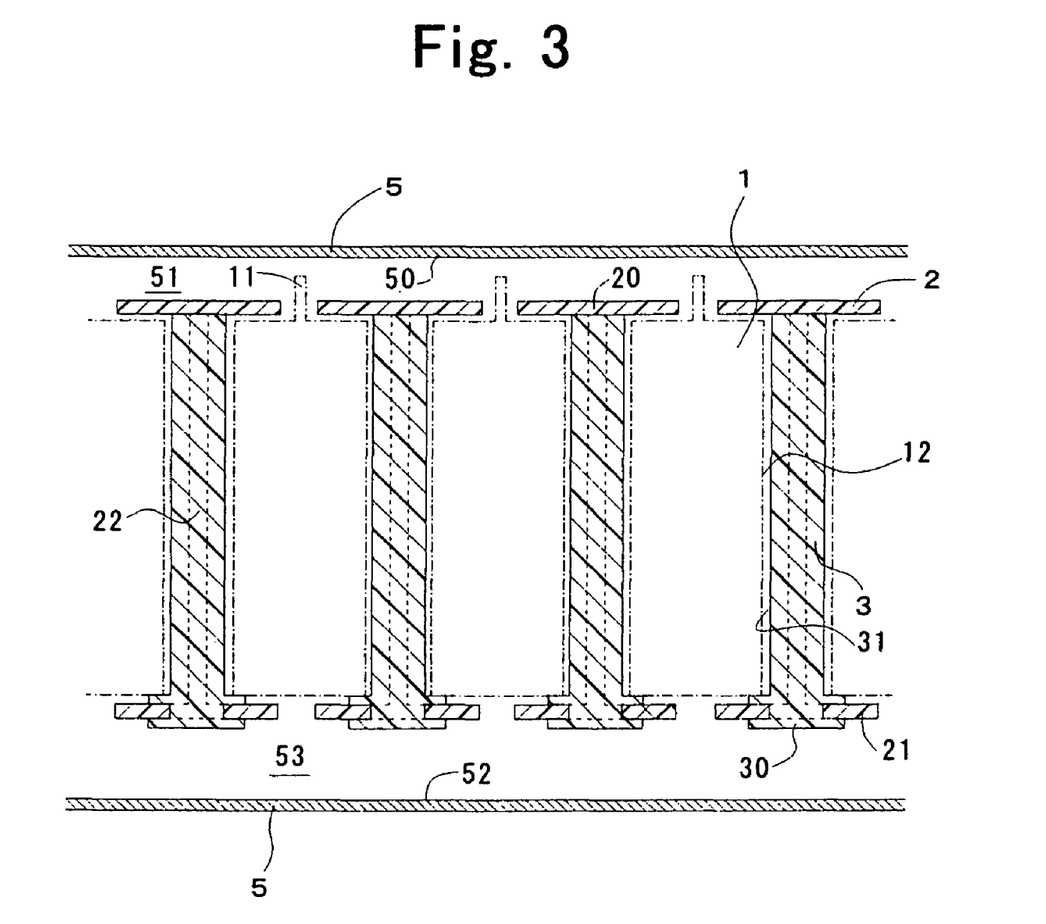
FIG. 3 is a cross-sectional diagram for illustrating a major section of the present battery assembly according to Example No. 1.

FIG. 1 illustrates a battery assembly according to Example No. 1 of the present invention in an exploded perspective diagram. The present battery assembly according to Example No. 1 comprises a few dozens of single-battery cells 1, spacers 2, and thermally-conductive members 3. The single-battery cells 1 are formed as a rectangular parallelepiped configuration, and have two largest-area side surfaces 12, respectively. The spacers 2 are made from electrically insulatable resin. A half of the single-battery cells 1 and thermally-conductive members 3 are disposed one after another alternately in a row, thereby making left-side battery subassembly in the drawing. The other half of the single-battery cells 1 and thermally-conductive members 3 are likewise disposed one after another alternately in a row, thereby making right-side battery subassembly in the drawing. The resulting two lines of battery subassemblies, the left-side and right-side battery subassemblies are disposed parallelly to each other. Note that the spacers 2 intervene between the neighboring single-battery cells 1 by way of the thermally-conductive members 3 in the two lines of the battery subassemblies, which are disposed parallelly to each other, respectively. That is, a constituent of the battery subassemblies is made up of a pair of the single-battery cells 1 and a pair of the thermally-conductive members 3, which appear perpendicularly to the parallelly-disposed two lines of the battery subassemblies in the drawing, and one of the spacers 2. Moreover, in the parallelly-disposed two lines of the battery subassemblies, the largest-area side surfaces 12 of the neighboring single-battery cells 1 face to each other by way of the spacers 2 with the thermally-conductive members 3 being interposed between them. In addition, at the opposite ends of the left-side and right-side battery subassemblies, a binder plate 4, which is made from resin, is disposed, respectively. Moreover, a not-shown clamping rod binds the left-side and right-side battery subassemblies in such a pressurized manner that the respective single-battery cells 1 and spacers 2 adhere to each other by way of the thermally-conductive members 3. The entire left-side and right-side battery subassemblies, which are under the pressurized condition, are accommodated in a casing 5, which is made from electrically insulatable resin, as illustrated in FIG. 3.

A lithium-ion secondary battery makes the single-battery cells 1, respectively. Specifically, battery elements, such as electrode plates, a separator and an electrolytic solution, are accommodated within a housing 10, which is made from aluminum. Paired electrodes 11, a positive electrode and a negative electrode, protrude from the top of the housing 10. Moreover, the housing 10 has six side surfaces. As described above, the housings 10 are disposed one after another in a row so as to face the largest-area side surfaces 12 to each other.

Figure 2:
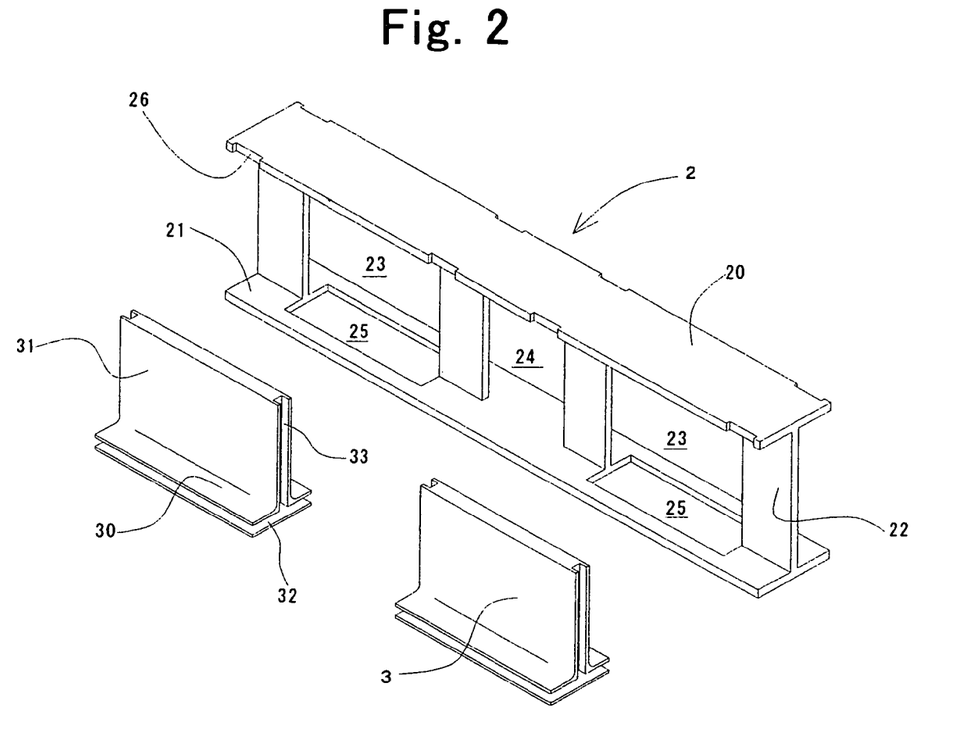
FIG. 2 is a perspective diagram for illustrating a spacer and a pair of thermally-conductive members, which are used in the present battery assembly according to Example No. 1.

The spacers 2 are made from polypropylene (PP) resin. As illustrated in FIG. 2, the spacers 2 comprise an upper plate 20, a lower plate 21, and a vertical plate 22, respectively. The spacers 2 are formed as a substantially letter "H" configuration in cross section, respectively, in which the vertical plate 22 connects between the upper plate 20 and the lower plate 21. The vertical plate 22 is provided with a pair of windows 23 and a ventilation opening 24, which are formed to penetrate the vertical plate 22. The lower plate 21 is provided with a pair of bottom windows 25, which communicate with the windows 23. Note that the size of the windows 23 is made smaller by one size than that of the configuration of the single-battery cell 1's largest-area side surface 12. Moreover, the upper plate 20 is provided with eight cut-offs 26, with which the four paired electrodes 11 of the four single-battery cells 1 engage, on the opposite sides.

The windows 23 and bottom windows 25 of the spacers 2 retain the two thermally-conductive members 3 in them. The thermally-conductive members 3 are formed of silicone rubber. Note that the silicone rubber exhibited an Askar C hardness of 45, and a thermal conductivity of 5 W/m·K.

As illustrated in FIG. 2, the thermally-conductive members 3 comprise a plate-shaped base 30, and a vertical wall 31, respectively. The vertical wall 31 erects upright from the base 31. The thermally-conductive members 3 are formed as a substantially letter "T" configuration in cross section, respectively. The side surfaces of the base 30 are provided with a first groove 32, which goes around the base 30 completely. The both side surfaces of the vertical wall 31 are provided with a second groove 33, respectively. Note that the first groove 32 engages with the peripheral rim of the respective bottom windows 25 of the spacer 2's lower plate 21, and that the second grooves 33 engage with the peripheral rim of the respective windows 23 of the spacer 2's vertical plate 22.

Thus, one of the spacers 2 retains two of the thermally-conductive members 3, respectively.

When the two thermally-conductive members 3 are thus retained to the spacer 2, the surfaces (i.e., claimed contact surfaces) of the vertical wall 31 of each thermally-conductive member 3 protrude by from 0.2 to 0.3 mm toward the opposite sides of the vertical plate 22 beyond the windows 23 of the vertical plate 22 of the spacer 2. Moreover, the bottom surface (i.e., claimed radiation surface) of the base 30 of each thermally-conductive member 3 protrudes by from 0.2 to 0.3 mm downward beyond the bottom windows 25 of the lower plate 21 of the spacer 2.

FIG. 3 illustrates the present battery assembly according to Example No. 1 in a cross-sectional diagram. Note that FIG. 3 shows such a state in a cross-sectional view that no pressurizing force for binding them is applied at all from the opposite ends of the battery subassembly, though the single-battery cells 1 and the spacers 2 and thermally-conductive members 3 are disposed one after another alternately in a row.

As illustrated in FIG. 3, the largest-area side surfaces 12 of the single-battery cells 1 face the surfaces (i.e., claimed contact surfaces) of the vertical walls 31 of the thermally-conductive members 3, respectively. Moreover, the bottom side surfaces of the single-battery cells 1 make contact with the bases 30 of the thermally-conductive members 3, respectively. In addition, the top wall 50 of the casing 5 and the top plates 20 of the spacers 2 make a clearance 51 between them. Accordingly, the paired electrodes 11 of the single-battery cells 1 are inhibited from interfering with the top wall of the casing 5. Moreover, the bottom wall 52 of the casing 5 and the lower plates 21 of the spacer makes a space 53 (i.e., claimed radiation space) between them. The resulting space 53 opens at the opposite ends in the direction being vertical to the drawing sheet, thereby distributing air-conditioning air from one of the opposite openings to the other one of the opposite openings perpendicularly with respect to the drawing sheet.

When binding the battery subassemblies by means of pressurizing them with a not-shown clamping rod, the constituent parts of the battery subassemblies are pressed to each other by a predetermined load that is applied to the opposite ends of the battery subassemblies. Specifically, the vertical walls 31 of the thermally-conductive members 3 are compressed by the largest-area side surfaces 12 of the neighboring paired single-battery cells 1. Since the thermally-conductive members 3 exhibit an Askar C hardness of 45, the vertical walls 31 are soft. Accordingly, the vertical walls 31 of the thermally-conductive members 3 are deformed readily by the compression, thereby not only adhering to the largest-area side surfaces of the single-battery cells 1 but also exhibiting a thinned-out thickness. Note that the sticking-out protrusions, which result from the vertical walls 31 of the thermally-conductive members 3 that exhibit the thinned-out thickness, can be absorbed or canceled because the bases 30 of the thermally-conductive members 3 expand further out into the space 53.

Specifically, the present battery assembly according to Example No. 1 transfers the heat, which the single-battery cells 1 produce, to the vertical walls 31 of the thermally-conductive members 3, and then transmits it from the vertical walls 31 to the bases 30 of the thermally-conductive members 3, and eventually radiates it with air-conditioning air that is supplied to the space 53. Thus, the thermally-conductive members 3 carry out the heat radiation under substantially the same condition to each other. Accordingly, the respective single-battery cells 1 are cooled under an identical condition virtually. Consequently, the present battery assembly according to Example No. 1 can equalize the cooling-characteristic differences between the single-battery cells 1.

Moreover, since all of the thermally-conductive members 3 are exposed to the space 53 in the same manner to each other, they are affected by the deposition of dust uniformly, if any. As a result, the present battery assembly according to Example No. 1 is free from such a drawback that results from the cooling-characteristic differences, which arise between the single-battery cells 1. In addition, even if dew condensation should have occurred inside the space 53, the resulting dewdrops fall downward within the space 53. Therefore, the present battery assembly according to Example No. 1 can prevent short circuit from taking place on the sides of the paired electrodes 11 of the respective single-battery cells 1.

In addition, even when the single-battery cells 1 try to expand thermally, the vertical plates 22 of the spacers 2 inhibit the single-battery cells 1 from expanding thermally. Accordingly, the spacers 2 enable the present battery assembly according to Example No. 1 to control the thermal expansions of the single-battery cells 1 securely. Moreover, since the thickness of the vertical plates 22 of the spacers 2 determine the interval between the single-battery cells 1, the spacers 2 make it possible to narrow down the distance between the single-battery cells 1 more than the above-described conventional technique of interposing spacers 101 having ribs 103 between the single-battery cells 1 as shown in FIG. 12. Consequently, the spacers 2 enable the present battery assembly according to Example No. 1 to occupy a reduced on-board space.

Example No. 2

Figure 4:
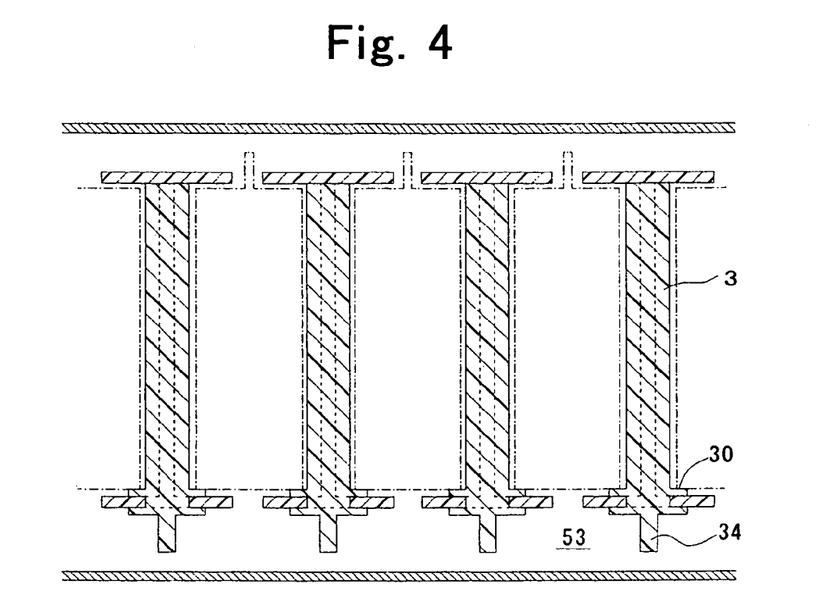
FIG. 4 is a cross-sectional diagram for illustrating a major section of a battery assembly according to Example No. 2 of the present invention.

As illustrated in FIG. 4, a battery assembly according to Example No. 2 of the present invention comprises the thermally-conductive members 3 that are provided with tabs 34, which protrude from the bases 30 downward into the space 53. Except for this feature, the present battery assembly according to Example No. 2 is constructed in the same manner as the present battery assembly according to Example No. 1.

The present battery assembly according to Example No. 2 comprises the tabs 34 that make the surface areas of the bases 30 of the thermally-conductive members 3, which are exposed to the space 53, greater. Therefore, the present battery assembly according to Example No. 2 materializes a cooling efficiency, which is upgraded more than that the present battery assembly according to Example No. 1 does.

Example No. 3

Figure 5:
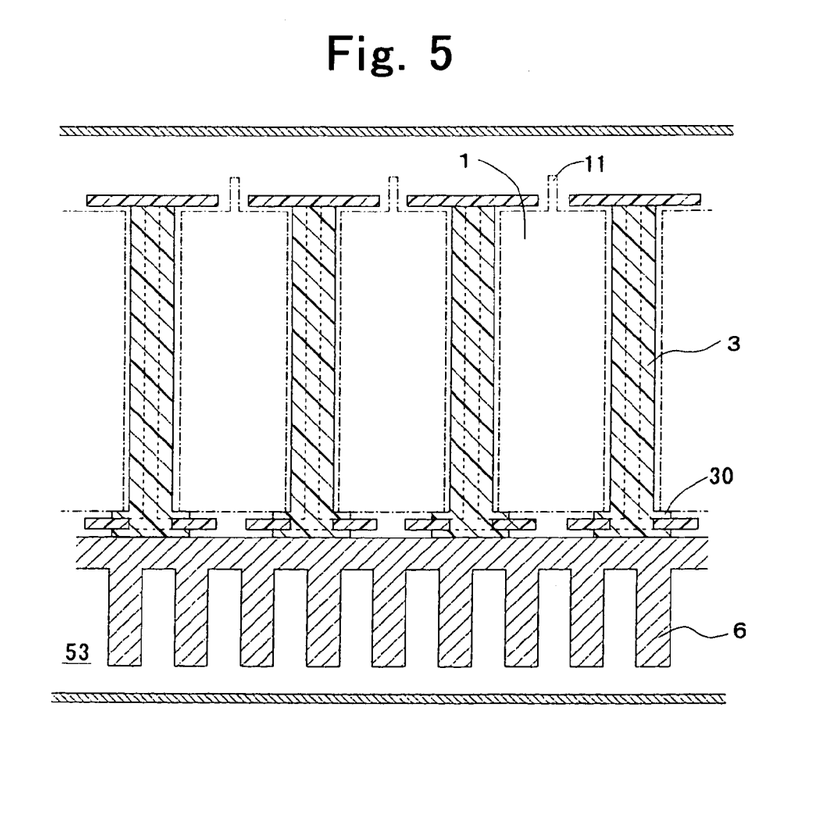
FIG. 5 is a cross-sectional diagram for illustrating a major section of a battery assembly according to Example No. 3 of the present invention.

Except that a battery assembly according to Example No. 3 of the present invention further comprises a metallic heat sink, it comprises the same constituent elements as those of the present battery assembly according to Example No. 1. As illustrated in FIG. 5, a metallic heat sink 6 comprises a plurality of radiator plates, which are disposed one after another in a row. Moreover, the metallic heat sink 6 makes contact with the bases 30 of the thermally-conductive members 3 that are exposed to the space 53.

The present battery assembly according to Example No. 3 transmits the heat, which the single-battery cells 1 produce, from the bases 30 of the thermally-conductive members 3 to the heat sink 6, and then radiates it from the heat sink 6 to the space 53 efficiently. Therefore, compared with the present battery assembly according to Example No. 1, the present battery assembly according to Example No. 3 demonstrates a furthermore enhanced cooling efficiency. Moreover, even if dew condensation should have occurred, it occurs on the surfaces of the heat sink 6. As a result, it is possible for the present battery assembly according to Example No. 3 to inhibit short circuit from taking place on the sides of the paired electrodes 11 of the single-battery cells 1.

Example No. 4

Figure 6:
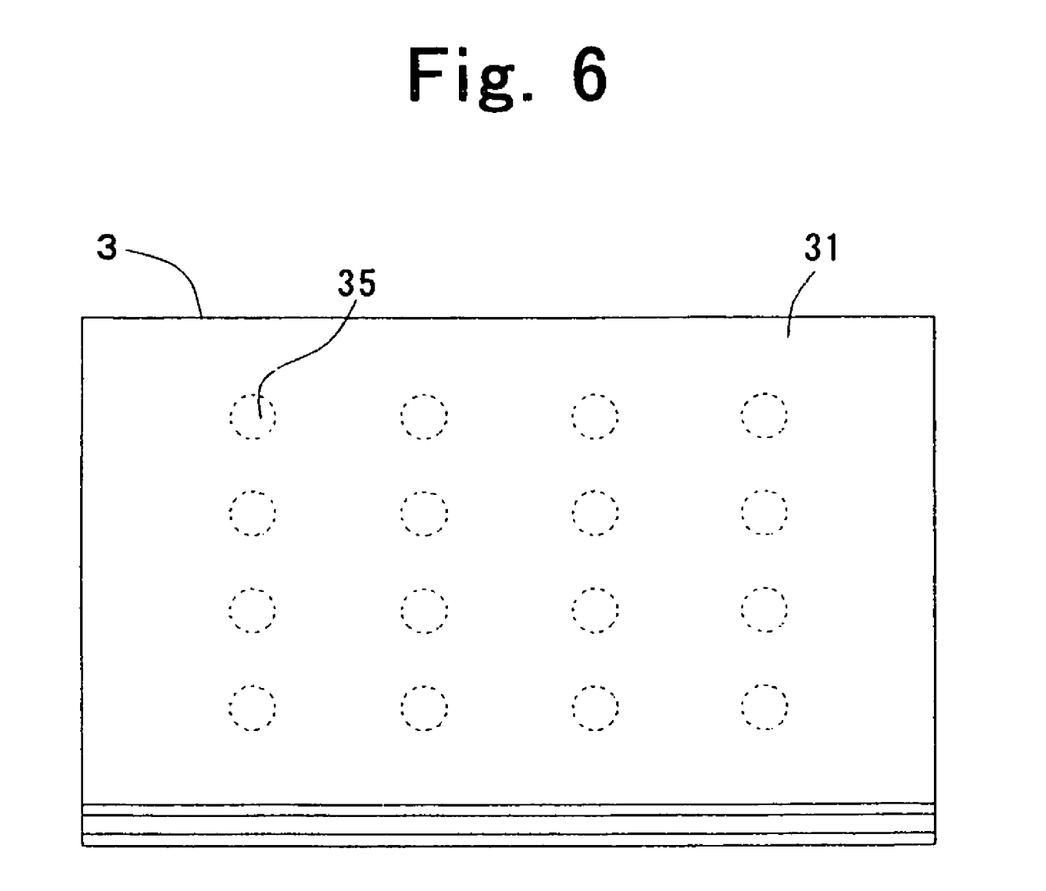
FIG. 6 is a front-view diagram for illustrating a thermally-conductive member, which is used in a battery assembly according to Example No. 4 of the present invention.
Figure 7:
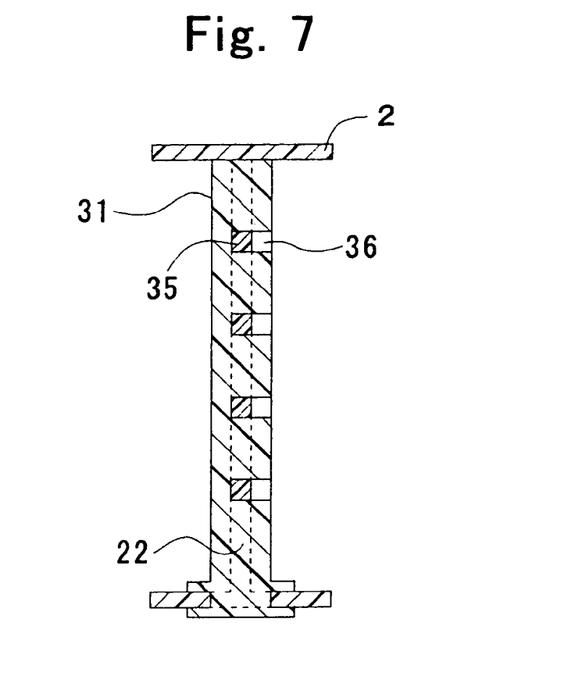
FIG. 7 is a cross-sectional diagram for illustrating a major section of the present battery assembly according to Example No. 4.

Except that a battery assembly according to Example No. 4 of the present invention further comprises hard resinous chips being made from polypropylene (PP) resin, it comprises the same constituent elements as those of the present battery assembly according to Example No. 1. As illustrated in FIGS. 6 and 7, the vertical walls 31 of the thermally-conductive members 3 hold hard resinous chips 35 therein, that is, the hard resinous chips 35 are buried in the vertical walls 31. Moreover, the hard resinous chips 35 are dispersed in the vertical walls 30 of the thermally-conductive members 3 in a dotted manner.

In addition, the hard resinous chips 35 are formed as a solid cylindrical configuration, and have a height that is made equal to the thickness of the vertical plates 22 of the spacers 2 as shown in FIG. 7. The vertical walls 31 of the thermally-conductive members 3 are provided with a plurality of insertion holes 36. The insertion holes 36 extend in the thickness direction of the vertical walls 31 from one of the opposite surfaces of the vertical walls 31 to the other one of the opposite surfaces. The hard resinous chips 35, which are prepared separately, are fitted into the insertion holes 36 so that they are buried in the central sections of the vertical walls 31 of the thermally-conductive members 3.

Therefore, even when the single-battery cells 1, which are disposed on the opposite sides of the vertical walls 31 of the thermally-conductive members 3, undergo thermal expansion so that the largest-area surfaces 12 press the vertical walls 31 of the thermally-conductive members 3 from the opposite sides, the hard resinous chips 35, which are buried in the vertical walls 31, inhibit the single-battery cells 1 from undergoing the thermal expansion. Thus, it follows that the hard resinous chips 35 enable the present battery assembly according to Example No. 4 to prevent the single-battery cells 1 from thermally expanding excessively.

The present battery assembly according to Example No. 4 comprises the hard resinous chips 35 that are made independently of the vertical walls 31 of the thermally-conducive members 3. However, note that it is possible to effect the same advantage when such hard resinous chips are made integrally out of a part of the spacers 2 so as to protrude from the spacers 2 inwardly into the windows 23.

Example No. 5

Figure 8:
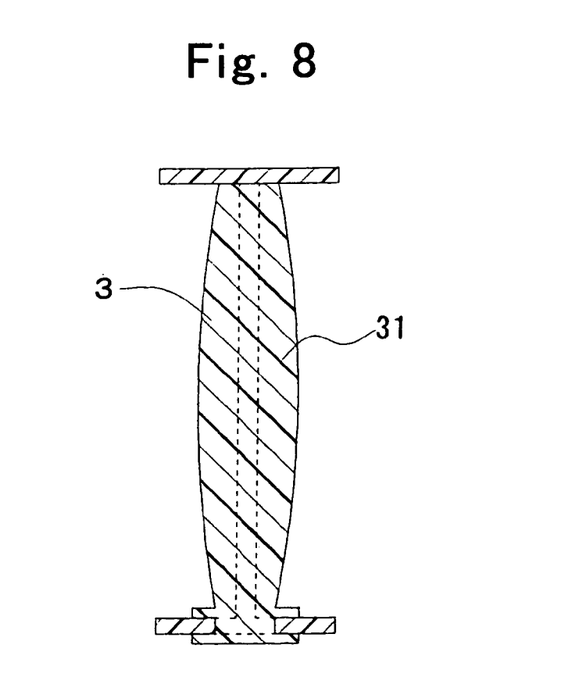
FIG. 8 is a cross-sectional diagram for illustrating a major section of a battery assembly according to Example No. 5 of the present invention.

As illustrated in FIG. 8, a battery assembly according to Example No. 5 of the present invention comprises the thermally-conductive members 30 whose vertical walls 31's spherical configuration is formed as a convexed spherical configuration that bulges outward. Except for this feature, the present battery assembly according to Example No. 5 is constructed in the same manner as the present battery assembly according Example No. 1.

When binding the thus made thermally-conductive members 3 with the single-battery cells 1 by means of pressurizing them, the central part of the thermally-conductive members 3' convexed spherical surfaces first come in contact with the single-battery cells 1's largest-area surfaces 12, and then produce an increasing contact areas, which enlarge from the center to the outside as the thermally-conductive members 3 are compressed by the single-battery cells 1, in the vertical walls 31 of the thermally-conductive members 3 that contact with the single-battery cells 1. Accordingly, the thermally-conductive members 3's convexed spherical contact surfaces prevent air from remaining between the largest-area surfaces 12 of the single-battery cells 1 and the contact surfaces of the thermally-conductive members 3's vertical walls 31. Consequently, the single-battery cells 1 and the thermally-conductive members 3 are assembled with upgraded adhesion. All in all, the present battery assembly according to Example No. 5 exhibits furthermore improved heat radiatability.

EXPERIMENTAL EXAMPLES

Experimental Example No. 1

Figure 9:
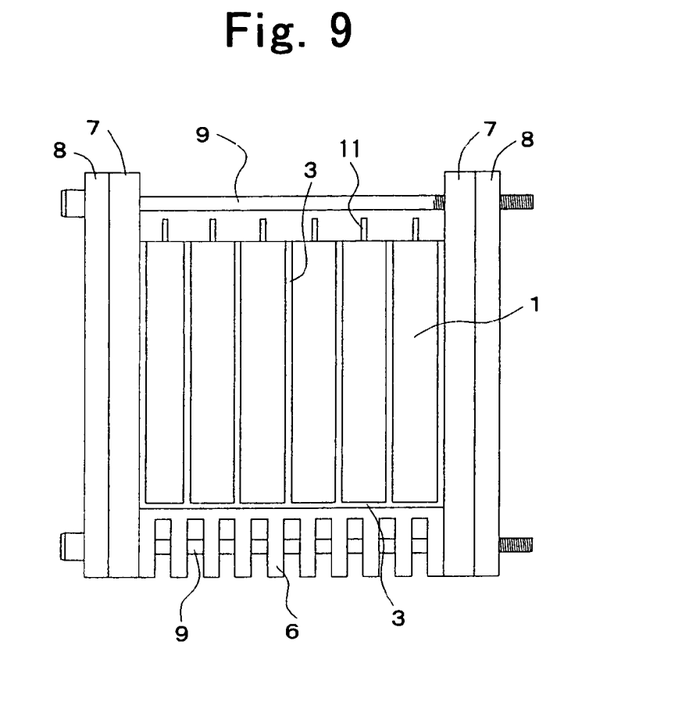
FIG. 9 is a front-view diagram for illustrating a battery assembly, which was used in Experimental Example Nos. 1 through 3.

FIG. 9 illustrates a battery assembly according to Experimental Example No. 1. The battery assembly according to Experimental Example No. 1 will be hereinafter described while designating its constituent elements, which function in the same manner as those of the above-described examples, with the same reference numerals as those used for describing the constituent elements of the examples. Note that the battery assembly according to Experimental Example No. 1 makes an example of the present invention, because it comprised substantially the same constituent elements as those in Example No. 3 though it was free from the spacers 2.

As illustrated in FIG. 9, the battery assembly according to Experimental Example No. 1 comprised single-battery cells 1, and thermally-conductive sheets 3. The single-battery cells 1 were the same as those used in Example No. 1. The thermally-conductive sheets 3 were formed of the same material as the one used for making the thermally-conductive members 3 in Example No. 1. The single-battery cells 1 and the thermally-conductive sheets 3 were disposed one after another alternately in a row, thereby making a battery subassembly. A phenol-resin (Bakelite (trademark)) plate 7 and a metallic plate 8 were disposed at the opposite ends of the resulting battery subassembly, respectively, and then the single-battery cells 1 and thermally-conductive sheets 3 were bound with clamping rods 9 in such a manner that they were pressurized to each other. As shown in the drawing, the thermally-conductive sheets 3 were also disposed so to be in contact with the bottom surfaces of the single-battery cells 1. Moreover, the thus disposed thermally-conductive sheets 3 make contact with a heat sink 6.

Figure 11:
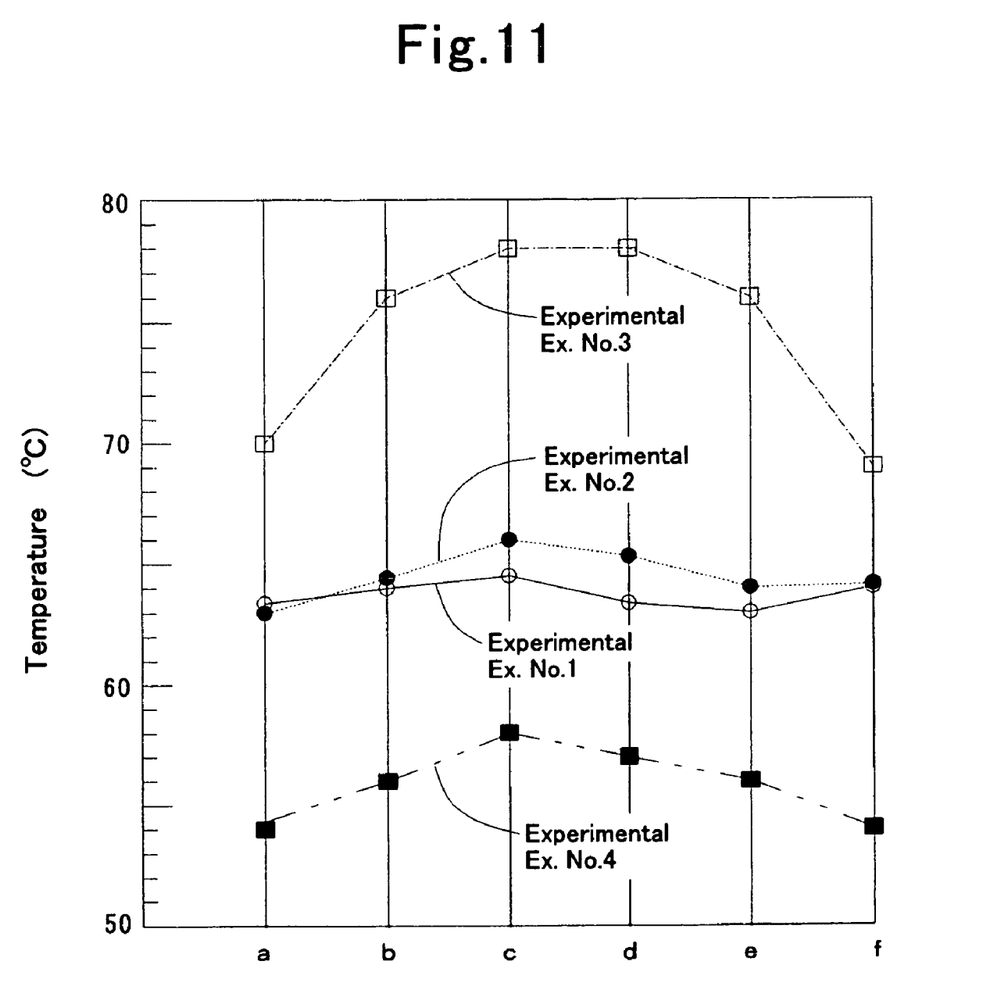
FIG. 11 is a graph for showing temperatures that were exhibited by respective single-battery cells of the battery assemblies, which were used in Experimental Example Nos. 1 through 4.

Specifically, the battery assembly according to Experimental Example No. 1 was made up of the single-battery cells 1, which were connected in series, in a quantity of six. The battery assembly according to Experimental Example No. 1 was charged for 800 seconds while supplying air to the heat sink 6. Note that the temperature of the supplied air was controlled at 26.1° C., and the air-flow volume was 0.8 m³/minute. Immediately after the 800 seconds had passed, the superficial temperatures of the respective single-battery cells 1 were measured. FIG. 11 illustrates the measurement results. Note that the six single-battery cells 1 were distinguished with identifier symbols, "a" through "f," from the left side to the right side in FIG. 9 as well as in FIG. 11.

Experimental Example No. 2

Other than the construction that the used thermally-conductive sheets 3 were made from silicone rubber whose thermal conductivity was 3 W/m·K, a battery assembly according to Experimental Example No. 2 of the present invention was prepared in the same manner as the battery assembly according to Experimental Example No. 1. Thus, although the battery assembly according to Experimental Example No. 2 was not provided with the spacers 2, it makes an example of the present invention because it is configured in substantially the same fashion as Example No. 3.

The battery assembly according to Experimental Example No. 2 was examined for the superficial temperatures of the respective single-battery cells 1 in the same manner as described in Experimental Example No. 1. The measurement results are also incorporated into FIG. 1.

Experimental Example No. 3

Except that a battery assembly according to Experimental Example No. 3 of the present invention comprised the thermally-conductive sheets 3 that were made from polypropylene (PP) resin instead of the silicone rubber, it comprised the same constituent elements as those of the battery assembly according to Experimental Example No. 1. The battery assembly according to Experimental Example No. 3 likewise makes an example of the present invention. In order to measure the temperatures of the respective single-battery cells 1, the battery assembly according to Experimental Example No. 3 was subjected to the same temperature measurement as described in Experimental Example No. 1. Similarly, FIG. 11 illustrates the measurement results.

Experimental Example No. 4

Figure 10:
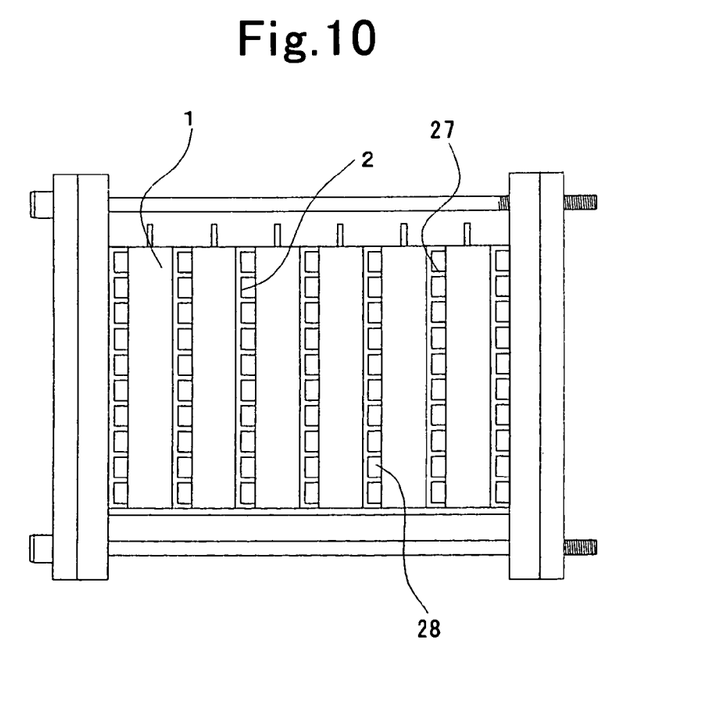
FIG. 10 is a front-view diagram for illustrating a battery assembly, which was used in Experimental Example No. 4.

A battery assembly according to Experimental Example No. 4 was prepared in the same manner as the battery assembly according to Experimental Example No. 1 other than the following features. That is, as illustrated in FIG. 10, spacers 2, which were made from polypropylene (PP) resin, were used instead of the silicone-rubber thermally-conductive sheets 3, and the heat sink 6 was not used. The spacer 2 were provided with a plurality of ribs 27 that extended perpendicularly to the drawing sheet, thereby forming spaces 28 between the ribs 27. The battery assembly according to Experimental Example No. 4 was equivalent to the conventional battery assembly shown in FIG. 12 virtually.

Specifically, in the battery assembly according to Experimental Example No. 4, six of the single-battery cells 1 were connected in series in total. As air, whose temperature was controlled at 26.1° C., was supplied through the spaces 28 in an air-flow volume of 0.8 m³/minute, the battery assembly according to Experimental Example No. 4 was charged for 800 seconds. Immediately after the battery assembly according to Experimental Example No. 4 had been charged for 800 seconds, it was measured for the superficial temperatures of the respective single-battery cells 1. The measurement results are incorporated into FIG. 11 as well.

Evaluation

In the battery assembly according to Experimental Example No. 3, the temperature difference between the superficial temperature, which the single-battery cell 1 being designated with the identifier symbol "c", that is, one being located at the central position in the direction of the row-like one-after-another arrangement, exhibited, and the superficial temperatures, which the opposite-end single-battery cells 1 being designated with the identifier symbols "a" and "f," exhibited, was so great as about 10° C. Accordingly, in the battery assembly according to Experimental Example No. 3, each of the single-battery cells 1 showed a cooling efficiency that was extremely uneven to each other. Compared with the battery assembly according to Experimental Example No. 3, the battery assembly according to Experimental Example No. 4 reduced the temperature differences between the respective single-battery cells 1 to no more than about 4° C. at the maximum. Consequently, it is seen that intervening the spacers 2, which were provided with the ribs 27 and spaces 28, equalized the cooling efficiency for each one of the respective single-battery cells 1. However, note that the battery assembly according to Experimental Example No. 4 was tested in an initial clean (or dust-free) environment. Therefore, in the battery assembly according to Experimental Example No. 4, it is assumed that the temperature differences between the respective single-battery cells 1 have enlarged adversely when dust deposits in the spaces 28, for instance.

On the other hand, the battery assembly according to Experimental Example No. 2 effected an equivalent advantage, reducing the temperature differences between the respective single-battery cells 1 to less than about 4° C. at the maximum, though no spaces are provided between the respective single-battery cells 1. Specifically, it is apparent that the temperature difference between the respective single-battery cells 1 could be diminished by merely using the silicone-rubber thermally-conductive sheets 3 instead of the polypropylene-resin thermally-conductive sheets 3 that were used in Experimental Example No. 3. Moreover, when the battery assembly according to Experimental Example No. 2 is in service, it is hardly possible to assume that the temperature differences between the respective single-battery cells 1 enlarge, because no such a drawback arises that dust deposits in spaces. Therefore, the battery assembly according to Experimental Example No. 2 can demonstrate cooling performance, which is equal to its original cooling performance, even after it is used for a long period of time.

Moreover, the battery assembly according to Experimental Example No. 1 reduced the temperature differences between the respective single-battery cells 1 to as remarkably low as less than about 1.5° C. at the maximum. This advantage apparently results from using the thermally-conductive sheets 3 whose thermal conductivity was higher than that of the thermally-conductive sheets 3 used in the battery assembly according to Experimental Example No. 2.

Having now fully described the present invention, it will be apparent to one of ordinary skill in the art that many changes and modifications can be made thereto without departing from the spirit or scope of the present invention as set forth herein including the appended claims.

What is claimed is:

1. A battery assembly, comprising:
a plurality of single-battery cells being formed as a rectangular parallelepiped configuration;
a plurality of thermally-conductive members having a plated configuration and being formed of a material selected from the group consisting of rubber and thermoplastic elastomer that is mixed with a sufficient amount of highly thermally-conductive material for providing the thermally-conductive members with a thermal-conductivity of 5 W/m·K or more, the thermally-conductive members exhibiting an Askar C hardness of 50 or less and electric insulatability;
the battery assembly being made by contacting the single-battery cells and the thermally-conductive members to each other, disposing them one after another alternately in a row, and binding them by means of pressurizing them on both ends thereof in opposite directions to a direction of disposing them one after another alternately in a row;
the thermally-conductive members comprising a contact surface, to which a largest-area side surface of the single-battery cells contacts, and a radiation surface, which is exposed to a radiation space; and
the single-battery cells being cooled indirectly by cooling the radiation surfaces of the thermally-conductive members,
wherein the battery assembly is free of any clearance or gap between the respective single-battery cells and the thermally-conductive members.

2. The battery assembly according to claim 1 further comprising a casing for accommodating a superimposed subassembly including a plurality of the single-battery cells and thermally-conductive members being disposed one after another alternately in a row, wherein:
the radiation space comprises a tunnel-shaped space, which the casing and the radiation surfaces of the thermally-conductive members make therebetween, and which extend in a direction of disposing the single-battery cells and thermally-conductive members one after another alternately in a row; and
cooling air is introduced into the resulting radiation space.

3. The battery assembly according to claim 1 further comprising an electrically-insulatable hard spacer for partially retaining the thermally-conductive members at a periphery thereof.

4. The battery assembly according to claim 1 further comprising an electrically-insulatable inhibitor for inhibiting the largest-area side surfaces of the single-battery cells from approaching to each other, wherein:
at least one of the thermally-conductive members is provided with the electrically-insulatable inhibitor.

5. The battery assembly according to claim 1, wherein at least one of the thermally-conductive members further comprises a base, and a tab protruding from the base into the radiation space.

6. The battery assembly according to claim 1, wherein the thermally-conductive members consist of the silicone rubber mixed with a thermoplastic elastomer having a sufficient amount of highly thermally-conductive material for providing the thermally-conductive members with the thermal-conductivity of 5 W/m·K or more.

7. A battery assembly, comprising:
a plurality of single-battery cells being formed as a rectangular parallelepiped configuration;
a plurality of thermally-conductive members having a plated configuration and electric insulatability and being formed of a material selected from the group consisting of rubber and thermoplastic elastomer that is mixed with a sufficient amount of highly thermally-conductive material for providing the thermally-conductive members with a thermal-conductivity of 5 W/m·K or more;
the battery assembly being made by contacting the single-battery cells and the thermally-conductive members to each other, disposing them one after another alternately in a row, and binding them by means of pressurizing them on both ends thereof in opposite directions to a direction of disposing them one after another alternately in a row;
the thermally-conductive members comprising a contact surface, to which a largest-area side surface of the single-battery cells contacts, and a radiation surface, which is exposed to a radiation space;
the single-battery cells being cooled indirectly by cooling the radiation surfaces of the thermally-conductive members;
a casing for accommodating a superimposed subassembly including a plurality of the single-battery cells and thermally-conductive members being disposed one after another alternately in a row;
the radiation space comprising a tunnel-shaped space, which the casing and the radiation surfaces of the thermally-conductive members make therebetween, and which extend in a direction of disposing the single-battery cells and thermally-conductive members one after another alternately in a row, and cooling air being introduced into the resulting radiation space; and
a heat sink, wherein:
the heat sink is disposed in the radiation space, and comprises a plurality of radiation plates being disposed one after another in a row, and
the radiation surface of at least one of the thermally-conductive members contacts the heat sink.

8. The battery assembly according to claim 7, wherein the thermally-conductive members exhibit an Askar C hardness of 50 or less.

9. The battery assembly according to claim 7, wherein the thermally-conductive members consist of the silicone rubber mixed with a thermoplastic elastomer having a sufficient amount of highly thermally-conductive material for providing the thermally-conductive members with the thermal-conductivity of 5 W/m·K or more.

10. A battery assembly, comprising:
a plurality of single-battery cells being formed as a rectangular parallelepiped configuration;
a plurality of thermally-conductive members having a plated configuration and electric insulatability; and the thermally-conductive members being formed of a thermoplastic material having a thermal-conductivity of 5 W/m·K or more and an Askar C hardness of 50 or less;
the battery assembly being made by contacting the single-battery cells and the thermally-conductive members to each other, disposing them one after another alternately in a row, and binding them by means of pressurizing them on both ends thereof in opposite directions to a direction of disposing them one after another alternately in a row;
the thermally-conductive members comprising a contact surface, to which a largest-area side surface of the single-battery cells contacts, and a radiation surface, which is exposed to a radiation space; and
the single-battery cells being cooled indirectly by cooling the radiation surfaces of the thermally-conductive members,
wherein the battery assembly is free of any clearance or gap between the respective single-battery cells and the thermally-conductive members.

11. The battery assembly according to claim 10, wherein the thermally-conductive members consist of the silicone rubber and a sufficient amount of highly thermally-conductive material for providing the thermally-conductive members with the thermal-conductivity of 5 W/m·K or more.

* * * * *